(12) United States Patent
Michalopoulos (10) Patent No.: US 11,985,622 B2
(45) Date of Patent: May 14, 2024

(54) METHOD OF CORRECTING TIME OF DEPARTURE IN OBSERVED TIME DIFFERENCE OF ARRIVAL POSITIONING

(71) Applicant: NOKIA TECHNOLOGIES OY, Espoo (FI)

(72) Inventor: Diomidis Michalopoulos, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 326 days.

(21) Appl. No.: 17/599,292

(22) PCT Filed: Apr. 2, 2019

(86) PCT No.: PCT/EP2019/058292
§ 371 (c)(1),
(2) Date: Sep. 28, 2021

(87) PCT Pub. No.: WO2020/200429
PCT Pub. Date: Oct. 8, 2020

(65) Prior Publication Data
US 2022/0191817 A1    Jun. 16, 2022

(51) Int. Cl.
*H04W 64/00*    (2009.01)
*G01S 5/00*    (2006.01)
*G01S 5/02*    (2010.01)
*G01S 5/10*    (2006.01)
*H04L 5/00*    (2006.01)

(52) U.S. Cl.
CPC .......... *H04W 64/00* (2013.01); *G01S 5/0036* (2013.01); *G01S 5/0236* (2013.01); *G01S 5/10* (2013.01); *H04L 5/0048* (2013.01)

(58) Field of Classification Search
CPC .... H04W 64/00; H04L 5/0048; G01S 5/0036; G01S 5/10
USPC .......................................................... 455/456
See application file for complete search history.

(56) References Cited

U.S. PATENT DOCUMENTS

| | | | |
|---|---|---|---|
| 2017/0188191 A1 | 6/2017 | Aldana et al. | |
| 2018/0146332 A1 | 5/2018 | Opshaug et al. | |
| 2019/0281587 A1* | 9/2019 | Zhang | H04W 72/23 |
| 2020/0007288 A1* | 1/2020 | Manolakos | H04L 5/006 |

OTHER PUBLICATIONS

First Examination Report dated Apr. 6, 2022 corresponding to Indian Patent Application No. 202147049290.

(Continued)

*Primary Examiner* — Ted M Wang
(74) *Attorney, Agent, or Firm* — SQUIRE PATTON BOGGS (US) LLP (57) ABSTRACT

A method, apparatus, and a computer-readable storage medium are provided for correcting time of departure of positioning reference signals (PRRs) used in estimating location of a user equipment in wireless networks. In one example implementation, the method may include receiving, by a user equipment (UE), one or more positioning reference signals (PRSs) from each cell of a plurality of cells. The example method may further include determining, by the user equipment (UE), arrival times of positioning reference signals (PRSs) from different cells of the plurality of cells; and transmitting, by the user equipment (UE), reference signal time difference (RSTD) values.

20 Claims, 5 Drawing Sheets

(56) References Cited

OTHER PUBLICATIONS

International Search Report and Written Opinion dated Jun. 26, 2019 corresponding to International Patent Application No. PCT/EP2019/058292.
Vivo, "Views on NR downlink positioning techniques," 3GPP Draft; R1-1900149, 3GPP TSG RAN WG1 Ad-Hoc Meeting 1901, Taipei, Jan. 20, 2019, XP051593075.
Zte, "Considerations on NR PRS design," 3GPP Draft; R1-1812658, 3GPP TSG RAN WG1 Meeting #95, Spokane, USA, Nov. 11, 2018, XP051554614.
Ericsson, "On the support of NR OTDOA," 3GPP Draft; R2-1812440, 3GPP TSG-RAN WG2 Meeting #103, Gothenburg, Sweden, Aug. 10, 2018, XP051522037.

* cited by examiner

METHOD OF CORRECTING TIME OF DEPARTURE IN OBSERVED TIME DIFFERENCE OF ARRIVAL POSITIONING

TECHNICAL FIELD

This description relates to wireless communications, and in particular, to estimating position of a user equipment (UE) in wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium are provided for correcting time of departure of positioning reference signals (PRRs) used in estimating location of a user equipment in wireless networks. In one example implementation, the method may include receiving, by a user equipment (UE), one or more positioning reference signals (PRSs) from each cell of a plurality of cells. In the example method, a second positioning reference signal (PRS) of the one or more positioning reference signals (PRSs) from a cell of the plurality of cells includes a second time of departure of the second positioning reference signal (PRS), the second time of departure being relative to a first time of departure of a first reference positioning reference signal (PRS) received from the cell, the first reference positioning reference signal (PRS) being a reference positioning reference signal (PRS) of the plurality of one or more positioning reference signals (PRSs) that is transmitted first from the cell. The example method may further include determining, by the user equipment (UE), arrival times of positioning reference signals (PRSs) from different cells of the plurality of cells; and transmitting, by the user equipment (UE), reference signal time difference (RSTD) values, a reference signal time difference (RSTD) value of the reference signal time difference (RSTD) values being determined based at least on the first and second times of departure and the arrival times of positioning reference signals (PRSs) from different cells of the plurality of cells.

DETAILED DESCRIPTION

Figure 1:
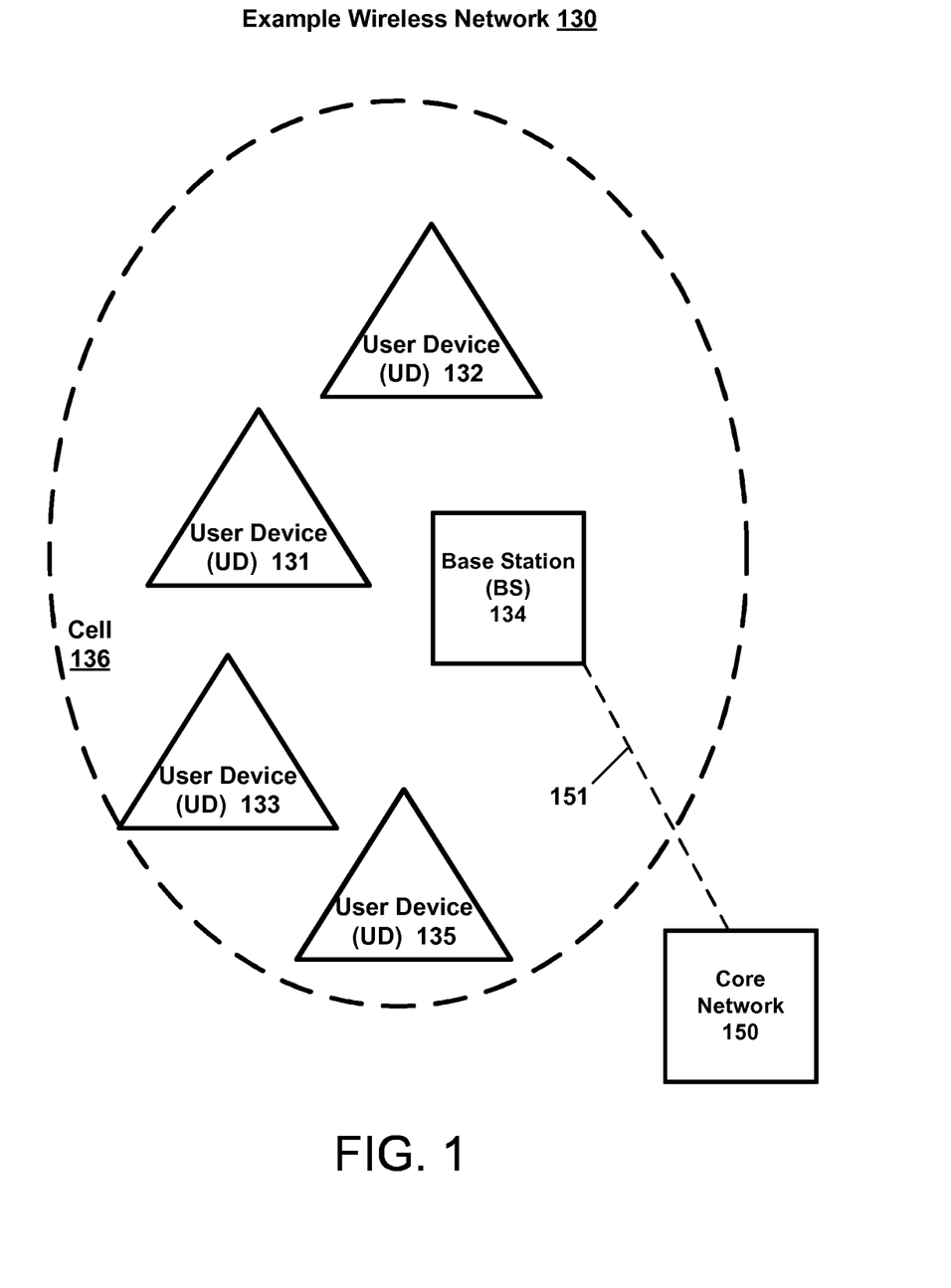
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix to determine, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

The present disclosure is related to Observed Time Difference of Arrival (OTDOA) and/or as Downlink Time Difference of Arrival (DL-TDOA) positioning based on specific reference signals, referred to as positioning reference signals (PRSs), used exclusively for positioning purposes in wireless networks.

The PRSs are transmitted from separate physical location points (e.g., cells, base stations, transmission points, gNB, etc.) and are measured by a user equipment (UE) with respect to differences in arrival times at the UE. That is, a UE measures the time differences in the arrival of two PRSs (e.g., PRS 1 and PRS 2) and reports the respective reference signal time difference (RSTD) value that equals the time difference of arrival corresponding to the two PRSs to the network. Then, based on this report and other additional reports associated with other physical location points, the network may be able to estimate the location of the UE.

However, the procedure described above to determine OTDOA and/or DL-TDOA is time-sensitive. For example, the location of the UE is estimated based on the reported time of arrival, or more precisely, time difference of arrival of PRSs. This implies that the PRSs should be transmitted from different physical location points in a synchronized manner But, if the PRSs are not completely synchronized, the network should know, at least, the time difference of transmission of the respective PRSs so that the network can correct the differences when generating a reference signal time difference (RSTD) report.

In LTE, such synchronization is relatively easy since a) the location server (e.g., located at the core network) is aware of the potential synchronization differences of the different transmission points and therefore corrections to the RSTD values can be made; and b) each transmission point transmits a single PRS. However, in New Radio (NR)/5G, features such as beam-specific PRS and/or dynamic PRS complicate this process.

For example, in 5G/NR, multiple PRSs may be transmitted from a transmission point, with each PRS corresponding to a different beam, where such different beams are transmitted in different time instances according to a process known as "beam sweeping." That is, in beamformed systems, each beam, transmitted at a distinct time instance and sequentially one after another, conveys a separate PRS, associated with a different PRS ID. A downlink (DL) PRS resource may be defined as a set of resource elements used for NR DL PRS transmission that can span multiple PRBs within one or more consecutive symbol(s) within a slot. For NR DL PRS resource design, a PRS resource should have a PRS resource ID and a PRS sequence should have a PRS sequence ID. A typical assumption is that PRS resource IDs transmitted by the same physical location are assigned the same PRS sequence ID.

The transmission of multiple PRSs per transmission point by means of beam-specific PRS IDs results in a non-efficient resource usage. In this regard, there is a need that PRSs are configured and transmitted in a dynamic fashion. This means that in situations where higher accuracy is needed, the PRSs are transmitted with increased resources, e.g., higher bandwidth and/or periodicity. More importantly, since in beamformed scenarios PRSs are sent in a beam-sweeping manner, less or even zero PRS resources should be allocated to beams which do not correspond to any UE requesting a positioning service. In other words, this means that NR should be able to exclude certain beams from transmitting PRS at given time instances, resulting in an overall non-uniform allocation of PRS across beams.

There are various problems associated with dynamic PRS allocation in beamformed setups. For instance, in dynamic PRS scenarios, the time sequence of PRS IDs across different beams is not static. This means that the UE does not know (nor can it straightforwardly infer) the time sequence of the PRS IDs. As a result, the UE is not aware of the transmission time of the PRS IDs it receives, such that even if it forms the RSTD based on the time-difference of the reception time of such received PRS IDs, this RSTD cannot be used as such unless additional processing is applied.

It is noted that if the feature of dynamic PRS is not included, but instead there is a static PRS allocation, then the problem of correcting the transmission times of PRS transmitted from different beams would still exist. This is because there will still be differences in the transmission times of different PRS resource IDs.

The present disclosure proposes a mechanism that would assign the PRS Resource IDs in a sequential manner, and transmit the sequence of PRS Resource IDs via the LPP protocol as part of the location assistance information. In one example implementation, the technical solution to the problem described above may include a method that provides the UE with the necessary information for correcting the time-difference of departure of the PRS Resource IDs the UE receives. The inventive step thus relates to adding to the PRS Resource IDs additional information which reflects the time of departure of the given PRS Resource ID. In another example implementation, this information on the time of departure of the respective PRS Resource IDs may be encoded into the PRS Resource ID number itself.

Figure 2:
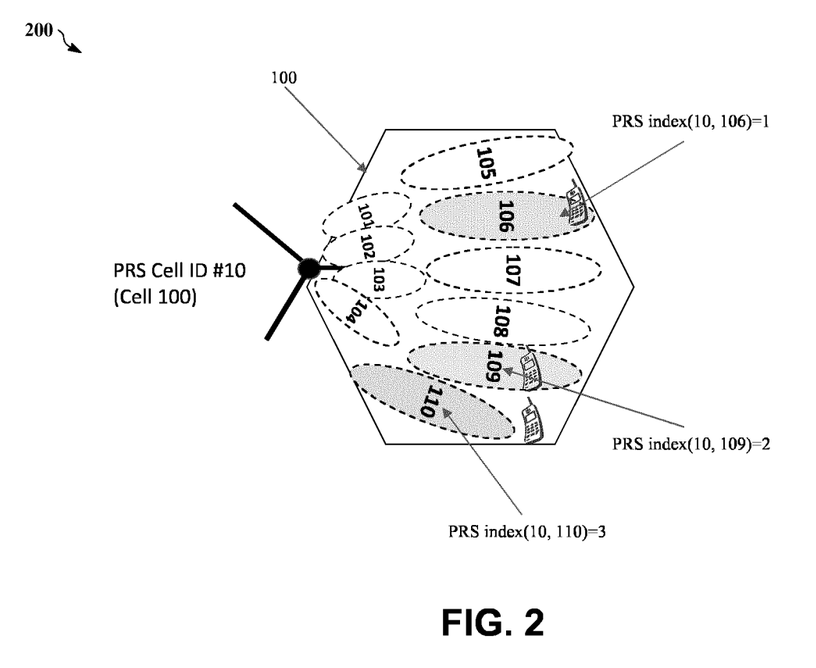
FIG. 2 is a diagram illustrating transmission of positioning reference signals (PRSs) from a cell, according to an additional example implementation.

FIG. 2 is a block diagram illustrating transmission of positioning reference signals (PRSs) from a cell (e.g., cell 100), according to an example implementation. In some implementations, the cell may be also referred to as a base station, physical location point, transmission point, gNB (next generation NB/gNB or 5G NB), or an eNB.

As shown in FIG. 2, cell 100 may be configured to transmit one or more PRSs. In an example implementation, cell 100 may be configured to transmit PRSs 101-110. Each of the PRSs 101-110 may be associated with different PRS Resource IDs and may be further associated with different beams transmitted from the cell. For example, in a beamformed system as shown in FIG. 2, the beams may be transmitted from the cell one after the other and each beam may transmit its own PRS and associated with a different PRS Resource ID. In some implementations, the beams may be transmitted in a beam sweeping order which indicates that the beams (and therefore the PRSs) are transmitted in a given order. In the present disclosure, the term PRS may be interchangeably used with PRS Resource ID. For example, PRS 101 may be also referred to as PRS resource ID 101, etc.

In addition, in some implementations, PRS Resource IDs may be associated with a PRS Cell ID. For example, PRS Resource IDs 101-110 may be associated with PRS Cell ID #10, as shown in FIG. 2. That is, a set of PRS Resource IDs may be grouped together as a set and associated with a PRS Cell ID (e.g., Cell ID value of 10). In some implementations, this may allow for indicating a time of departure (or time of departure information) of a PRS Resource ID, from a cell, in relative terms (and not in absolute terms). In other words, the time of departure of a PRS/PRS Resource ID may be expressed as time of departure relative to a time of departure of a first PRS Resource ID transmitted from the cell and the number of time units (e.g., milliseconds, ms) between consecutive PRS Resource IDs of a PRS Cell ID. In some implementations, the PRS Cell ID may be referred to as PRS Cell identifier, PRS Sequence ID, etc. In some implementations, the association between PRS Resource ID, PRS Cell ID, and relative time information may be relayed to a UE via Observed Time Difference of Arrival (OTDOA) in LTE or Downlink Time Difference of Arrival (DL-TDOA) assistance information in 5G/LTE.

In some implementations, although cell 100 is configured to support transmitting PRSs 101-110, cell 100 (PRS Cell ID #10) may not transmit all PRSs (PRSs 101-110) all the time. Cell 100, in some implementations, may support transmitting PRSs in a dynamic manner. For example, in some implementations, cell 100 may transmit PRS Resource IDs 106, 109, and 110, as shown in FIG. 2. In other words, in some implementations, cell 100 may skip transmitting some beams (and therefore corresponding PRSs) from the cell.

In some implementations, a PRS/PRS Resource ID transmitted from a cell may include (or convey) the following information: i) a PRS Cell ID associated with the PRS Resource ID and ii) time of departure of the PRS Resource ID from the cell. The he time of departure of the PRS Resource ID may be indicated as a time of departure relative to a time of departure of a first PRS Resource ID that is transmitted from the cell (e.g., time of departure of a PRS Resource ID relative to a time of departure of a PRS Resource ID 106 (in the example scenario of FIG. 2) that is transmitted first from the cell (e.g., prior to any other PRS Resource IDs from transmitted from the cell).

In some implementations, for example, as shown in FIG. 2, cell 100 may transmit PRSs/PRS Resource IDs 106, 109, and 110, in a dynamic manner and in a beam sweeping order. For example, PRS Resource ID 106 may include information that PRS resource ID 106 is associated with PRS Cell ID #10 and relative time of departure of PRS Resource ID 106, which may be zero as PRS Resource ID 106 is the first PRS Resource ID transmitted from cell 100. It should be noted that, although cell 100 may be configured with ten PRSs (PRSs 101-110), only PRSs 106, 109, and 110 are transmitted from PRS Cell ID #10 at a given occasion, e.g., a PRS positioning occasion. In some implementations, for example, in another positioning occasion, the PRSs transmitted from PRS Cell ID #10 may change, for instance, from PRSs 106, 109, and 110 to PRSs 105 and 109 depending on the number (e.g., less or more) of UEs in the area requesting positioning services. In some implementations, for example, PRS Resource ID 109 may include information that PRS Resource ID 109 is associated with PRS Cell ID #10 and relative time of departure of PRS Resource ID 109, which may be 1X as PRS Resource ID 109 is the second PRS Resource ID transmitted from PRS Cell ID 10, where X represents the time difference between consecutive PRS Resource ID transmissions from PRS Cell ID #10. Similarly, in some implementations, for example, PRS Resource ID 110 may include information that PRS Resource ID 110 is associated with PRS Cell ID #10 and the relative time of departure of PRS Resource ID 110, which may be 2X as PRS Resource ID 110 is the third PRS Resource ID transmitted from PRS Cell ID #10 (e.g., X representing the time difference between consecutive PRS Resource ID transmissions).

In some implementations, a PRS Resource ID may be modified such that the PRS Resource ID includes the value of a PRS Index (or a PRS Index value). The PRS Index may be considered as a counter which may be specific to each cell (e.g., specific to each PRS Cell ID) and/or to each PRS Resource ID. For example, the PRS Index may be an integer which may be increased by a value of one each time a new PRS Resource ID is transmitted from the cell. In some implementations, each time the first PRS Resource ID (also referred to as a reference PRS Resource ID) is transmitted from the cell, the PRS Index may be reset to zero.

In some implementations, the PRS Index may convey the time of departure information of a PRS Resource ID. The time of departure information may be relative to the time of departure of the reference PRS Resource ID (e.g., first PRS Resource ID transmitted from a cell prior to the transmission of any other PRS Resource IDs from the cell). In other words, each PRS Resource ID that is transmitted from a cell may contain information on how much time has elapsed after the transmission of first PRS Resource ID from the cell and before the current PRS Resource ID is being transmitted (in other words, time in between). For example, as shown in FIG. 2, the PRS Index values transmitted from PRS Cell ID #10 may be shown as below:

PRS Index (10, 106)=1
PRS Index (10, 109)=2, and
PRS Index (10, 110)=3

The above examples indicate that PRS Resource IDs 106, 109, and 110 are transmitted from PRS Cell ID #10 and that PRS Resource ID 106 is the first PRS Resource ID being transmitted from the cell. The PRS Index values 1, 2, and 3 indicate time differences of 0, 1X, and 2X, based on a time difference of X (ms) between consecutive PRS transmissions from PRS Cell ID #10.

Figure 3:
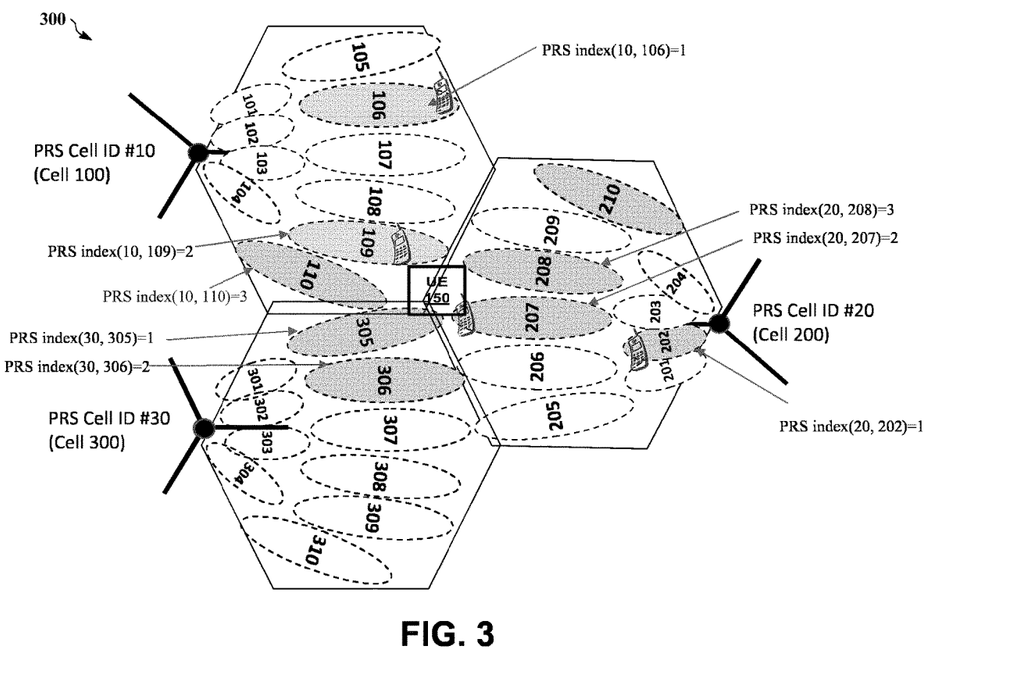
FIG. 3 is a diagram illustrating transmission of positioning reference signals (PRSs) from a plurality of cells, according to an additional example implementation.

FIG. 3 is a block diagram illustrating transmission of positioning reference signals (PRSs) or PRS Resource IDs from a plurality of cells, e.g., cells 100, 200, and 300, according to an example implementation.

In some implementations, UE 150 (which may be same or similar to user devices 131-135 of FIG. 1) may receive PRSs from cells 100, 200, and/or 300. A Location Server (also referred to as Location Management Function (LMF) in 5G/NR or a Gateway Mobile Location Centre (GMLC) in LTE) may rely on information from these cells (e.g., a serving cell and two neighbor cells) to estimate the location of the UE. In some implementations, a UE, e.g., UE 150, may determine RSTD values and report them to a network entity (for example, via a serving cell) that resides in the core network. Such a core network entity, for example, may be referred to as a Location Server (e.g., Gateway Mobile Location Centre (GMLC) in LTE; Location Management Function (LMF) in 5G/NR). In addition to the information received from a UE, the Location Sever may rely on information related to the physical locations of the cells and calculate (e.g., determine, compute, etc.) the estimated location of a UE. It should be noted that the communication between a UE and a Location Server is established via Non-Access Stratum (NAS) of a serving cell of the UE (e.g., cell 100/PRS Cell ID #10). In an example implementation, FIG. 3 illustrates PRSs/PRS Resource IDs transmitted from three cells, cells 100, 200, and 300 with PRS Cell IDs of 10, 20, and 30, respectively. In some implementations, a UE may report RSTD values to a network entity that resides in the radio access network (RAN) which may be configured with location management capabilities as described above (for example, a local LMF residing in the RAN). In such example implementations, the communication between the UE and the RAN-based entity may be established, e.g., via Radio Resource Control (RRC) protocol.

In some implementations, for example, as shown in FIG. 3 (and described in detail in reference to FIG. 2 above), PRS Cell ID #10 may transmit PRSs/PRS Resource IDs 106, 109, and 110, in a dynamic manner and in a beam sweeping order. For example, PRS Resource ID 106 may include information that PRS resource ID 106 is associated with PRS Cell ID #10 and relative time of departure of PRS Resource ID 106, which may be zero as PRS Resource ID 106 is the first PRS Resource ID transmitted from PRS Cell ID #10. It should be noted that, although PRS Cell ID #10 may be configured with ten PRSs (PRSs 101-110), only PRS Resource IDs 106, 109, and 110 may be transmitted from PRS Cell ID #10 at a given occasion, e.g., a PRS positioning occasion. In some implementations, for example, in another positioning occasion, the PRSs transmitted from PRS Cell ID #10 may change, for instance, from PRSs 106, 109 and 110 to PRSs 105 and 109, depending on the number (e.g., less or more) of UEs in the area requesting positioning services. In addition, in some implementations, for example, PRS Resource ID 109 may include information that PRS resource ID 109 is associated with PRS Cell ID #10 and relative time of departure of PRS Resource ID 109, which may be 1X as PRS 109 is the second PRS Resource ID transmitted from PRS Cell ID #10, where X represents the time difference between consecutive PRS Resource ID transmissions of PRS Cell ID #10. Similarly, in some implementations, for example, PRS Resource ID 110 may include information that PRS resource ID 110 is associated with PRS Cell ID #10 and relative time of departure of PRS Resource ID 110, which may be 2X as PRS 110 is the third PRS Resource transmitted from PRS Cell ID #10 (X representing the time difference between consecutive PRS Resource ID transmissions of PRS Cell ID #10).

Similarly, in some implementations, for example, as shown in FIG. 3, PRS Cell ID #20 may transmit PRSs/PRS Resource IDs 202, 207, 208, and 210, in a dynamic manner and in a beam sweeping order. For example, PRS Resource ID 202 may include information that PRS Resource ID 202 is associated with PRS Cell ID #20 and relative time of departure of PRS Resource ID 202, which may be zero as PRS 202 is the first PRS Resource ID transmitted from PRS Cell ID #20. It should be noted that, although PRS Cell ID #20 may be configured to transmit ten PRSs (PRSs 201-210), only PRSs 202, 207, 208, and 210 are transmitted from PRS Cell ID #20, in the example implementation of FIG. 3. In addition, in some implementations, for example, PRS Resource ID 207 may include information that PRS resource ID 207 is associated with PRS Cell ID #20 and relative time of departure of PRS Resource ID 207, which may be 1Y as PRS Resource ID 207 is the second PRS Resource ID transmitted from PRS Cell ID #20, where Y represents the time difference between consecutive PRS Resource ID transmissions of PRS Cell ID #20. Similarly, in some implementations, for example, PRS Resource ID 208 may include information that PRS resource ID 208 is associated with PRS Cell ID #20 and relative time of departure of PRS Resource ID 208, which may be 2Y as PRS 208 is the third PRS Resource ID transmitted from PRS Cell ID #20 (Y representing the time difference between consecutive PRS Resource ID transmissions of PRS Cell ID #20).

Similarly, in some implementations, for example, as shown in FIG. 3, PRS Cell ID #30 may transmit PRSs/PRS Resource IDs 305 and 306, in a dynamic manner and in a beam sweeping order. For example, PRS Resource ID 305 may include information that PRS Resource ID 305 is associated with PRS Cell ID #30 and relative time of departure of PRS Resource ID 305, which may be zero as PRS Resource ID 305 is the first PRS Resource ID transmitted from PRS Cell ID #30. It should be noted that, although PRS Cell ID #30 may be transmitted with ten PRSs (PRSs 301-310), only PRS Resource IDs 305 and 306 may be transmitted from PRS Cell ID #30. In addition, in some implementations, for example, PRS Resource ID 306 may include information that PRS resource ID 306 is associated with PRS Cell ID #30 and relative time of departure of PRS Resource ID 306, which may be 1Z as PRS 306 is the second PRS Resource ID transmitted from PRS Cell ID #30, where Z represents the time difference between consecutive PRS Resource ID transmissions of PRS Cell ID #30.

For example, in some implementations, UE 150 may receive PRS Resource IDs 109 and 207 from PRS Cell ID #10 and PRS Cell ID #20, respectively (e.g., from cells 100 and 200, respectively), as shown below:

PRS index (10, 109)=2
PRS index (20, 207)=2

Upon receiving the above mentioned PRS Resource IDs, UE 150 may determine that PRS Resource ID 109 is transmitted second from PRS Cell ID #10 and PRS Resource ID 207 is transmitted second from Cell ID 20. The PRS Resource IDs may further indicate X and Y values (e.g., via OTDOA/DL-TDOA assistance information) representing the time difference between consecutive PRS transmissions from PRS Cell ID #10 and PRS Cell ID #20, respectively. In some implementations, UE 150 may further determine the arrival times of PRS Resource ID 109 and PRS Resource 207 as $T_1$ and $T_2$, respectively, and may determine the RSTD value associated with these PRS Resource IDs as shown below, where "a" and "b" (e.g., obtained from PRS Index values using the formula a=PRS Index (10, 109)−1; b=PRS Index (20, 207)−1) represent the relative time differences with the reference PRSs in PRS Cell IDs 10 and 20, respectively:

$$RTSD_{109,207}=(T_1-aX)-(T_2-bY)$$

In a similar example, UE 150 may determine RSTD value associated with PRS Resource IDs 109 and 208 as shown below, where $T_3$ represents the arrival time of PRS Resource ID 208.

$$RTSD_{109,208}=(T_1-X)-(T_3-2Y)$$

In a further similar example, UE 150 may determine RSTD value associated with PRS Resource IDs 109 and 305 as shown below, where $T_4$ represents the arrival time of PRS Resource ID 305. It is noted that in the example of FIG. 3, since PRS Index(30, 305)=1, there are zero time units corrected from $T_4$, as shown below $$RTSD_{109,305}=(T_1-X)-(T_4-0 \cdot Z)=(T_1-X)-T_4$$

In the above mentioned examples, RSTD values ($RTSD_{109,208}$ and $RTSD_{109, 305}$) may be sufficient to provide a two-dimensional estimation of the location of a UE that receives the corresponding PRSs from the corresponding cells.

In some implementations, the UE (e.g., UE 150) may report the above determined RSTD values to the network, for example, to an entity that resides in the core network. In an example implementation, such core network entity may be a Location Server, which may be referred to Gateway Mobile Location Centre (GMLC) and Location Management Function (LMF) in 5G/NR. In some implementations, a UE may report RSTD values to a network entity that resides in the radio access network (RAN) which may be configured with location management capabilities as described above (for example, a local LMF residing in the RAN). In such example implementations, the communication between the UE and the RAN-based entity may be established, e.g., via Radio Resource Control (RRC) protocol. As the Location Server knows the physical locations of the cells, the Location Server estimates the location of UE 150 based on the RSTD reports it receives from UE 150.

Therefore, the above described mechanism provides the capability for estimating location of UEs to provide better services.

Figure 4:
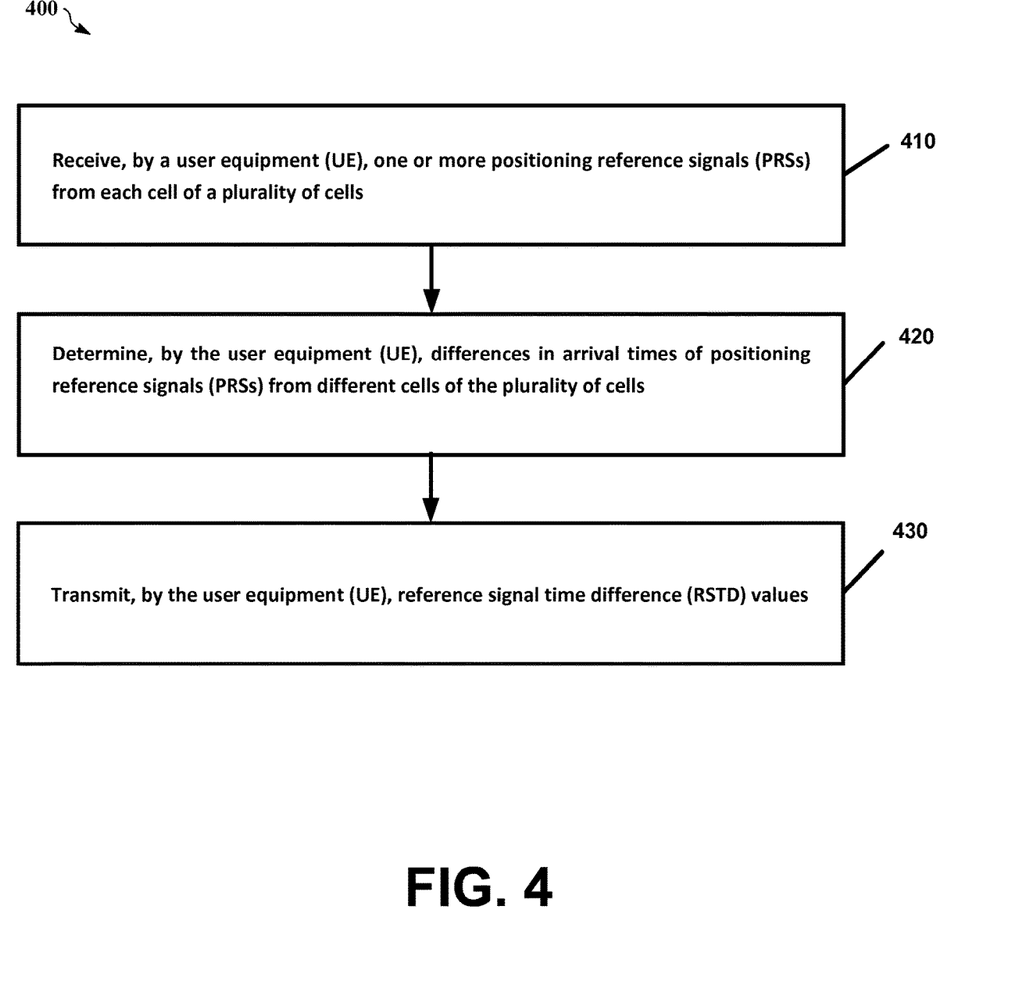
FIG. 4 is a flow chart illustrating transmitting reference signal time difference (RSTD) values, according to an example implementation.

FIG. 4 is a flow chart 400 illustrating transmission of reference signal time difference (RSTD) values from a user equipment (UE), e.g., UE 150, according to an example implementation.

At block 410, a UE may receive one or more PRSs from each cell of a plurality of cells. For example, in some implementations, UE 150 may receive one or more PRSs from each cell of a plurality of cells (e.g., cells 100, 200, and 300) as shown in FIG. 3. In some implementations, as described above, UE 150 may receive at least one PRS from three different cells, including a serving cell (e.g., cell 100) and two neighbor cells (e.g., cells 200 and 300).

In an example implementation, as shown in FIG. 3, UE 150 may receive the following PRS Resource IDs: 106, 109, and 110 from PRS Cell ID #10; 202, 207, 208, and 210 from PRS Cell ID #20; and 305 and 306 from PRS Cell ID #30. As described above in reference to FIGS. 2 and 3, each PRS Resource ID may convey a PRS Cell ID that indicates a cell the PRS Resource ID is transmitted from and the relative time of departure of the PRS Resource ID from the cell.

For example, in an implementation, PRS Resource ID 109 may relay that PRS Resource ID 109 is from PRS Cell ID #10 and relative time of departure as 1X µs; PRS Resource ID 207 may relay that PRS Resource ID 207 is from PRS Cell ID #20 and a relative time of departure as 1Y µs; and PRS Resource ID 305 may relay that PRS Resource ID 109 is from PRS Cell ID #30 and relative time of departure as 0 µs.

UE 150 may receive this information via the PRS Resource IDs based on the index values. For example, in some implementations, the PRS Resource IDs may be configured in such a way that they convey the index values of each of the PRS Resource IDs from the cells.

At block 420, the UE may determine arrival times of PRSs from different cells of the plurality of cells. For example, in some implementations, as described above, UE 150 may determine arrival times (e.g., T1, T2, T3, T4, etc.), as described above. The arrival times are the "timestamps" that the UE assigns to the events of receiving a PRS. That is, the UE may use its own clock to mark the time instances that the PRSs are received from different cells. Then, for forming the RSTD, the UE compares such timestamps.

At block 430, the UE may transmit RSTD values. The RTSD values may be determined as described above in reference to FIGS. 2 and 3.

Additional example implementations are described herein.

Example 1. A method of communications, comprising: receiving, by a user equipment (UE), one or more positioning reference signals (PRSs) from each cell of a plurality of cells, a second positioning reference signal (PRS) of the one or more positioning reference signals (PRSs) from a cell of the plurality of cells includes a second time of departure of the second positioning reference signal (PRS), the second time of departure being relative to a first time of departure of a first reference positioning reference signal (PRS) received from the cell, the first reference positioning reference signal (PRS) being a reference positioning reference signal (PRS) of the plurality of one or more positioning reference signals (PRSs) that is transmitted first from the cell; determining, by the user equipment (UE), arrival times of positioning reference signals (PRSs) from different cells of the plurality of cells; and transmitting, by the user equipment (UE), reference signal time difference (RSTD) values, a reference signal time difference (RSTD) value of the reference signal time difference (RSTD) values being determined based at least on the first and second times of departure and the arrival times of positioning reference signals (PRSs) from different cells of the plurality of cells.

Example 2. According to an example aspect of the method of Example 1, wherein each cell of the plurality of cells has a different positioning reference signal (PRS) cell identifier.

Example 3. According to an example aspect of the method of Example 1 or 2, wherein each beam transmitted from a cell of the plurality of cells has a different positioning reference signal (PRS) index value based on a positioning reference signal (PRS) resource identifier of the respective beam.

Example 4. According to an example aspect of the method of Example 1 or 3, wherein the second time of departure relative to the first time of departure is indicated to the user equipment (UE) via a an index value, wherein the index value is a positioning reference signal (PRS) index value.

Example 5. According to an example aspect of the method of Example 1, wherein the plurality of cells include at least a serving cell of the user equipment (UE) and at least two neighbor cells.

Example 6. According to an example aspect of the method of Example 1, wherein the reference signal time difference (RSTD) values are transmitted via long term evolution (LTE) positioning protocol (LPP).

Example 7. According to an example aspect of the method of Example 1, wherein the reference signal time difference (RSTD) values are transmitted to a network entity.

Example 8. According to an example aspect of the method of Example 7, wherein the network entity is a location management function (LMF) or a gateway mobile location centre (GMLC), and wherein the reference signal time difference (RSTD) values are transmitted to the network entity via a serving cell of the user equipment, the serving cell being a cell of the plurality of cells.

Example 9. According to an example aspect of the method of Example 1, wherein the second time of departure of the second positioning reference signal (PRS) relative to the first time of departure is indicated via a positioning reference signal (PRS) resource identifier (PRS Resource ID) of the second positioning reference signal (PRS), relative to a value of the positioning reference signal resource identified (PRS Resource ID) of the first positioning reference signal (PRS).

Example 10. An apparatus, comprising: at least one processor and at least one memory including a computer program code, wherein the at least one memory and the computer program code are configured, with the at least one processor, to cause the apparatus to perform operations comprising: receiving one or more positioning reference signals (PRSs) from each cell of a plurality of cells, a second positioning reference signal (PRS) of the one or more positioning reference signals (PRSs) from a cell of the plurality of cells includes a second time of departure of the second positioning reference signal (PRS), the second time of departure being relative to a first time of departure of a first reference positioning reference signal (PRS) received from the cell, the first reference positioning reference signal (PRS) being a reference positioning reference signal (PRS) of the plurality of one or more positioning reference signals (PRSs) that is transmitted first from the cell; determining arrival times of positioning reference signals (PRSs) from different cells of the plurality of cells; and transmitting reference signal time difference (RSTD) values, a reference signal time difference (RSTD) value of the reference signal time difference (RSTD) values being determined based at least on the first and second times of departure and the arrival times of positioning reference signals (PRSs) from different cells of the plurality of cells.

Example 11. According to an example aspect of the Apparatus of Example 10, wherein each cell of the plurality of cells has a different positioning reference signal (PRS) cell identifier.

Example 12. According to an example aspect of the Apparatus of Example 10 or 11, wherein each beam transmitted from a cell of the plurality of cells has a different positioning reference signal (PRS) index value based on a positioning reference signal (PRS) resource identifier of the respective beam.

Example 13. According to an example aspect of the Apparatus of Example 10 or 12, wherein the second time of departure relative to the first time of departure is indicated to the user equipment (UE) via an index value, wherein the index value is a positioning reference signal (PRS) index value.

Example 14. According to an example aspect of the Apparatus of Example 10, wherein the plurality of cells include at least a serving cell of the user equipment (UE) and at least two neighbor cells.

Example 15. According to an example aspect of the Apparatus of Example 10, wherein the reference signal time difference (RSTD) values are transmitted via long term evolution (LTE) positioning protocol (LPP).

Example 16. According to an example aspect of the Apparatus of Example 10, wherein the reference signal time difference (RSTD) values are transmitted to a network entity.

Example 17. According to an example aspect of the Apparatus of Example 16, wherein the network entity is a location management function (LMF) or a gateway mobile location centre (GMLC), and wherein the reference signal time difference (RSTD) values are transmitted to the network entity via a serving cell of the user equipment, the serving cell being a cell of the plurality of cells.

Example 18. According to an example aspect of the Apparatus of example 10, wherein the second time of departure of the second positioning reference signal (PRS) relative to the first time of departure is indicated via a positioning reference signal (PRS) resource identifier (PRS Resource ID) of the second positioning reference signal (PRS), relative to a value of the positioning reference signal resource identified (PRS Resource ID) of the first positioning reference signal (PRS).

Example 19. A computer program product comprising program instructions which, when loaded into an apparatus, execute a method, comprising: receiving, by a user equipment (UE), one or more positioning reference signals (PRSs) from each cell of a plurality of cells, a second positioning reference signal (PRS) of the one or more positioning reference signals (PRSs) from a cell of the plurality of cells includes a second time of departure of the second positioning reference signal (PRS), the second time of departure being relative to a first time of departure of a first reference positioning reference signal (PRS) received from the cell, the first reference positioning reference signal (PRS) being a reference positioning reference signal (PRS) of the plurality of one or more positioning reference signals (PRSs) that is transmitted first from the cell; determining, by the user equipment (UE), arrival times of positioning reference signals (PRSs) from different cells of the plurality of cells; and transmitting, by the user equipment (UE), reference signal time difference (RSTD) values, a reference signal time difference (RSTD) value of the reference signal time difference (RSTD) values being determined based at least on the first and second times of departure and the arrival times of positioning reference signals (PRSs) from different cells of the plurality of cells.

Example 20. According to an example aspect of the computer program product of example 19, wherein each cell of the plurality of cells has a different positioning reference signal (PRS) cell identifier.

Example 21. According to an example aspect of the computer program product of example 19 or 20, wherein each beam transmitted from a cell of the plurality of cells has a different positioning reference signal (PRS) index value based on a positioning reference signal (PRS) resource identifier of the respective beam.

Example 22. According to an example aspect of the computer program product of example 19 or 21, wherein the second time of departure relative to the first time of departure is indicated to the user equipment (UE) via a an index value, wherein the index value is a positioning reference signal (PRS) index value.

Example 23. According to an example aspect of the computer program product of example 19, wherein the plurality of cells include at least a serving cell of the user equipment (UE) and at least two neighbor cells.

Example 24. According to an example aspect of the computer program product of example 19, wherein the reference signal time difference (RSTD) values are transmitted via long term evolution (LTE) positioning protocol (LPP).

Example 25. According to an example aspect of the computer program product of example 19, wherein the reference signal time difference (RSTD) values are transmitted to a network entity.

Example 26. According to an example aspect of the computer program product of example 25, wherein the network entity is a location management function (LMF) or a gateway mobile location centre (GMLC), and wherein the reference signal time difference (RSTD) values are transmitted to the network entity via a serving cell of the user equipment, the serving cell being a cell of the plurality of cells.

27. According to an example aspect of the computer program product of example 19, wherein the second time of departure of the second positioning reference signal (PRS) relative to the first time of departure is indicated via a positioning reference signal (PRS) resource identifier (PRS Resource ID) of the second positioning reference signal (PRS), relative to a value of the positioning reference signal resource identified (PRS Resource ID) of the first positioning reference signal (PRS).

Figure 5:
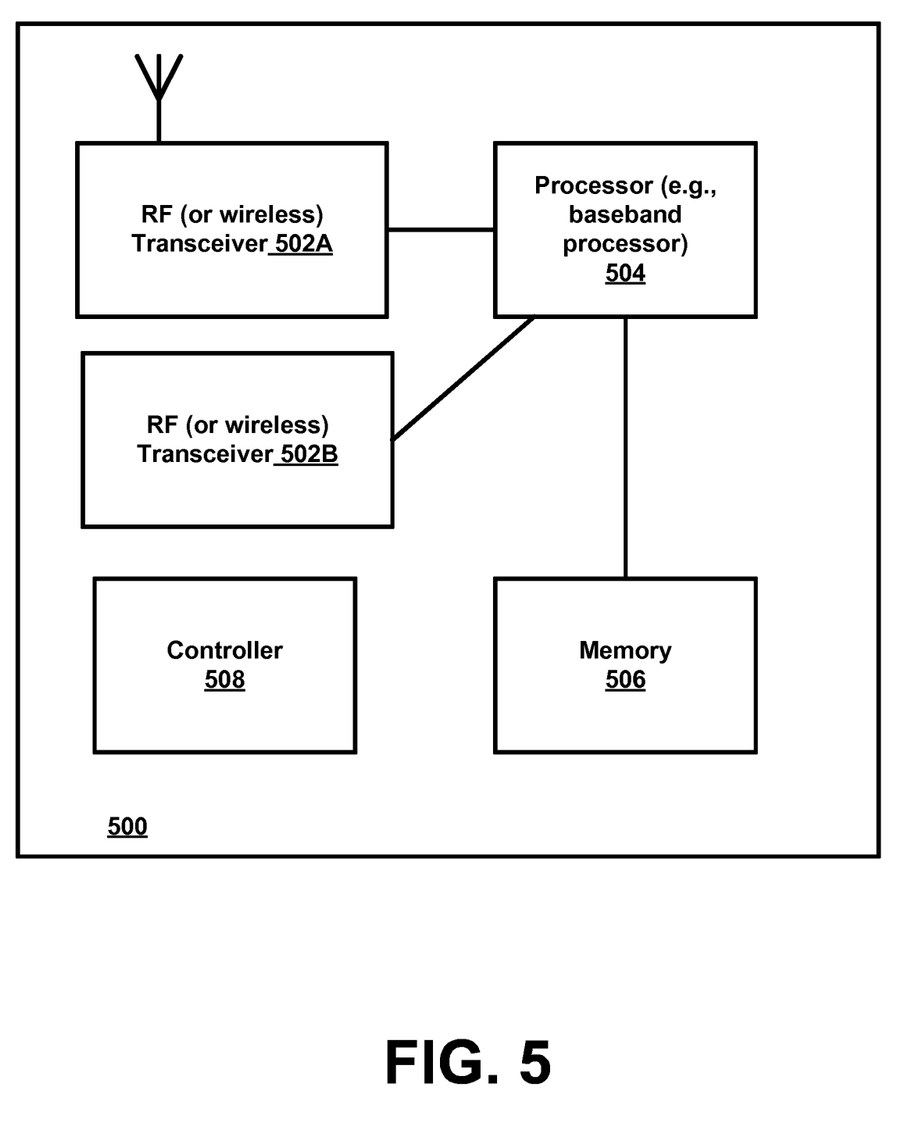
FIG. 5 is a block diagram of a node or wireless station (e.g., base station/access point or mobile station/user device/UE), according to an example implementation.

FIG. 5 is a block diagram of a wireless station (e.g., user equipment (UE)/user device or AP/gNB/MgNB/SgNB) 500 according to an example implementation. The wireless station 500 may include, for example, one or more RF (radio frequency) or wireless transceivers 502A, 502B, where each wireless transceiver includes a transmitter to transmit signals and a receiver to receive signals. The wireless station also includes a processor or control unit/entity (controller) 504/508 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502 (502A or 502B). Processor 504 may control transmission of signals or messages over a wireless network, and may control the reception of signals or messages, etc., via a wireless network (e.g., after being down-converted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software. Moreover, a storage medium may be provided that includes stored instructions, which when executed by a controller or processor may result in the processor 504, or other controller or processor, performing one or more of the functions or tasks described above.

According to another example implementation, RF or wireless transceiver(s) 502A/502B may receive signals or data and/or transmit or send signals or data. Processor 504 (and possibly transceivers 502A/502B) may control the RF or wireless transceiver 502A or 502B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, e.g., both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method, comprising:
   receiving, by a user equipment (UE), one or more positioning reference signals (PRSs) from each cell of a plurality of cells, a second positioning reference signal (PRS) of the one or more positioning reference signals (PRSs) from a cell of the plurality of cells includes a second time of departure of the second positioning reference signal (PRS), the second time of departure being relative to a first time of departure of a first reference positioning reference signal (PRS) received from the cell, the first reference positioning reference signal (PRS) being the first positioning reference signal (PRS) that is transmitted from the cell;
   determining, by the user equipment (UE), arrival times of positioning reference signals (PRSs) from different cells of the plurality of cells; and
   transmitting, by the user equipment (UE), reference signal time difference (RSTD) values, a reference signal time difference (RSTD) value of the reference signal time difference (RSTD) values being determined based at least on the first and second times of departure and the arrival times of positioning reference signals (PRSs) from different cells of the plurality of cells.

2. The method of claim 1, wherein each cell of the plurality of cells has a different positioning reference signal (PRS) cell identifier.

3. The method of claim 1, wherein each beam transmitted from a cell of the plurality of cells has a different positioning reference signal (PRS) index value based on a positioning reference signal (PRS) resource identifier of the respective beam.

4. The method of claim 1, wherein the second time of departure relative to the first time of departure is indicated to the user equipment (UE) via an index value, and wherein the index value is a positioning reference signal (PRS) index value.

5. The method of claim 1, wherein the plurality of cells include at least a serving cell of the user equipment (UE) and at least two neighbor cells.

6. The method of claim 1, wherein the reference signal time difference (RSTD) values are transmitted via long term evolution (LTE) positioning protocol (LPP).

7. The method of claim 1, wherein the reference signal time difference (RSTD) values are transmitted to a network entity.

8. The method of claim 7, wherein the network entity is a location management function (LMF) or a gateway mobile location centre (GMLC), and wherein the reference signal time difference (RSTD) values are transmitted to the network entity via a serving cell of the user equipment, the serving cell being a cell of the plurality of cells.

9. The method of claim 1, wherein the second time of departure of the second positioning reference signal (PRS) relative to the first time of departure is indicated via a positioning reference signal (PRS) resource identifier (PRS Resource ID) of the second positioning reference signal (PRS), relative to a value of the positioning reference signal resource identifier (PRS Resource ID) of the first positioning reference signal (PRS).

10. An apparatus, comprising:
    at least one processor; and
    at least one memory including a computer program code, wherein the at least one memory and the computer program code are configured, with the at least one processor, to cause the apparatus to perform operations comprising:
    receiving one or more positioning reference signals (PRSs) from each cell of a plurality of cells, a second positioning reference signal (PRS) of the one or more positioning reference signals (PRSs) from a cell of the plurality of cells includes a second time of departure of the second positioning reference signal (PRS), the second time of departure being relative to a first time of departure of a first reference positioning reference signal (PRS) received from the cell, the first reference positioning reference signal (PRS) being the first positioning reference signal (PRS) that is transmitted from the cell;
    determining arrival times of positioning reference signals (PRSs) from different cells of the plurality of cells; and
    transmitting reference signal time difference (RSTD) values, a reference signal time difference (RSTD) value of the reference signal time difference (RSTD) values being determined based at least on the first and second times of departure and the arrival times of positioning reference signals (PRSs) from different cells of the plurality of cells.

11. The apparatus of claim 10, wherein each cell of the plurality of cells has a different positioning reference signal (PRS) cell identifier.

12. The apparatus of claim 10, wherein each beam transmitted from a cell of the plurality of cells has a different positioning reference signal (PRS) index value based on a positioning reference signal (PRS) resource identifier of the respective beam.

13. The apparatus of claim 10, wherein the second time of departure relative to the first time of departure is indicated to the apparatus via a an index value, wherein the index value is a positioning reference signal (PRS) index value.

14. The apparatus of claim 10, wherein the plurality of cells include at least a serving cell of the apparatus and at least two neighbor cells.

15. The apparatus of claim 10, wherein the reference signal time difference (RSTD) values are transmitted via long term evolution (LTE) positioning protocol (LPP).

16. The apparatus of claim 10, wherein the reference signal time difference (RSTD) values are transmitted to a network entity.

17. The apparatus of claim 16, wherein the network entity is a location management function (LMF) or a gateway mobile location centre (GMLC), and wherein the reference signal time difference (RSTD) values are transmitted to the network entity via a serving cell of the apparatus, the serving cell being a cell of the plurality of cells.

18. The apparatus of claim 10, wherein the second time of departure of the second positioning reference signal (PRS) relative to the first time of departure is indicated via a positioning reference signal (PRS) resource identifier (PRS Resource ID) of the second positioning reference signal (PRS), relative to a value of the positioning reference signal resource identifier (PRS Resource ID) of the first positioning reference signal (PRS).

19. A non-transitory computer-readable medium comprising program instructions which, when executed by an apparatus, cause the apparatus to perform at least the following:
    receiving one or more positioning reference signals (PRSs) from each cell of a plurality of cells, a second positioning reference signal (PRS) of the one or more positioning reference signals (PRSs) from a cell of the plurality of cells includes a second time of departure of the second positioning reference signal (PRS), the second time of departure being relative to a first time of departure of a first reference positioning reference signal (PRS) received from the cell, the first reference positioning reference signal (PRS) being the first positioning reference signal (PRS) that is transmitted from the cell;

determining arrival times of positioning reference signals (PRSs) from different cells of the plurality of cells; and transmitting reference signal time difference (RSTD) values, a reference signal time difference (RSTD) value of the reference signal time difference (RSTD) values being determined based at least on the first and second times of departure and the arrival times of positioning reference signals (PRSs) from different cells of the plurality of cells.

20. The non-transitory computer readable medium of claim 19, wherein the second time of departure relative to the first time of departure is indicated to the apparatus via a an index value, wherein the index value is a positioning reference signal (PRS) index value.

* * * * *